US007877910B2

(12) United States Patent
Thorjussen et al.

(10) Patent No.: US 7,877,910 B2
(45) Date of Patent: Feb. 1, 2011

(54) DISPLAY SYSTEM

(75) Inventors: Nils Thorjussen, Austin, TX (US); Christopher Varrin, Monte Sereno, CA (US)

(73) Assignee: Barco, Inc., Duluth, GA (US)

( * ) Notice: Subject to any disclaimer, the term of this patent is extended or adjusted under 35 U.S.C. 154(b) by 838 days.

(21) Appl. No.: 11/329,431

(22) Filed: Jan. 11, 2006

(65) Prior Publication Data

US 2007/0159413 A1 Jul. 12, 2007

(51) Int. Cl.

| | |
|---|---|
| ***G09F 3/04*** | (2006.01) |
| ***G09G 5/00*** | (2006.01) |
| ***G01D 11/00*** | (2006.01) |
| ***G01D 13/00*** | (2006.01) |

(52) U.S. Cl. .......................... 40/452; 345/1.1; 116/200

(58) Field of Classification Search .......... 345/1.1–2.3, 345/55–59, 82, 83

See application file for complete search history.

(56) References Cited

U.S. PATENT DOCUMENTS

| | | | | |
|---|---|---|---|---|
| 4,160,973 | A | 7/1979 | Berlin, Jr. | |
| 6,237,290 | B1 * | 5/2001 | Tokimoto et al. | 52/236.3 |
| 6,314,669 | B1 | 11/2001 | Tucker | |
| 6,335,714 | B1 | 1/2002 | Wang et al. | |
| 6,362,801 | B1 | 3/2002 | Yuhara | |
| 6,677,918 | B2 | 1/2004 | Yuhara et al. | |
| 6,704,989 | B1 | 3/2004 | Lutz et al. | |
| 6,813,853 | B1 | 11/2004 | Tucker | |
| 2002/0005826 | A1 * | 1/2002 | Pederson | 345/82 |
| 2002/0145576 | A1 | 10/2002 | Leja | |

FOREIGN PATENT DOCUMENTS

| | | | |
|---|---|---|---|
| KR | 100201551 | B1 | 6/1999 |

OTHER PUBLICATIONS

PCT International Search Report and Written Opinion dated Jul. 24, 2007 issued by the Korean Intellectual Property Office, 7 pages.

* cited by examiner

*Primary Examiner*—Kevin M Nguyen
*Assistant Examiner*—Cory A Almeida
(74) *Attorney, Agent, or Firm*—Aka Chan LLP

(57) ABSTRACT

A display system is described having a plurality of display units, wherein each of the display units is movable between at least a first position and a second position, and wherein each display unit is provided with at least a first light emitting element. Each display unit may be configured to be rotatable about an axis thereof, such that the first position is defined as a first angular position of rotation about the axis, and the second position is defined as a second angular position of rotation about the axis. A method of operating a display system having a plurality of display units is also described, wherein each of the display units is movable between at least a first position and a second position, and wherein each display unit comprises at least a first light emitting element, the method including: moving the display units from the first position to the second position, thereby exposing a first display surface; controlling emission of light from the first light emitting element of each of the display units; and returning the display units to the first position.

44 Claims, 8 Drawing Sheets

DISPLAY SYSTEM

BACKGROUND OF INVENTION

Display systems for entertainment, architectural, and advertising purposes have commonly been constructed from arrays of light emitting elements such as light emitting diodes (LEDs) and incandescent lamps mounted onto or within flat panels. The light emitting elements can be selectively turned on and off to create patterns, graphics and video displays for both informational and aesthetic purposes. It is well known to construct these displays as tiles or large panels that are assembled in position for a specific entertainment show or event, or as an architectural or advertising display. Examples of such systems are disclosed in U.S. Pat. No. 6,813,853, U.S. Pat. No. 6,704,989, and U.S. Pat. No. 6,314,669. Such systems are typically heavy and time-consuming to install, and once in position are not easily altered. In addition, such systems are typically difficult to remove.

It is often necessary for a given event, theatrical production or architectural design to use such a display but to have the display easily removed. For example, it may be desirable to have the display removed between the scenes of a play or theatrical event or as the needs of the production otherwise dictate. In the case of an architectural installation, it may be desirable for the display to be visible at night, but removed or inconspicuous during the day. A display constructed as a large panel or as a series of large tiles can not easily be removed in this manner. Typically, as noted above, such displays are large and heavy and require significant support machinery, time, and storage space to move and install. For example, U.S. Pat. No. 6,704,989 discloses a system where individual display sections are lifted out of storage cases using a lifting truss, and are thereafter joined and stacked. Other prior art systems may use a tile-based structure wherein tiles, typically approximately 2 ft by 2 ft square, may be lifted by hand and installed manually. This is a time-consuming and complex process requiring the involvement of skilled personnel. Other prior art systems, such as the MiPIX system from Barco Media & Entertainment of Belgium use very small tiles that can be mounted within a framework. MiPIX tiles are small and easy to handle, but again are extremely time-consuming to install. Also, the resulting structure is heavy, unmanageable, and can not easily be removed.

It may be a further requirement for events, theatrical productions, advertisements or architectural designs that such display units be capable of being easily oriented in different directions. Again, the large size and weight of currently available units makes this difficult to achieve without complex support structures.

Another requirement for display systems for events, theatrical productions, advertisements or architectural designs is the need for the display to take up a minimal amount of storage space when stored and not in use. To meet this need, flexible substrate based displays have been created wherein the light emitting elements are incorporated into a fabric curtain as, for example, disclosed in U.S. Pat. No. 6,362,801 and U.S. Pat. No. 6,677,918. The fabric curtain compresses into a small space for storage. However, it is difficult to produce stable imagery with these curtain-based displays because the fabric or cloth backing both stretches and moves, thus changing the spatial relationship between the light emitting elements.

Another objective of these display units is the desire to create a controlled transparency of the unit. At some times it is desirable to see the display and the images shown on the display, while at other times it is desirable that the viewer be able to see through the display, so as to see scenery, performers, buildings, projection screens and the like that are located behind the display. One current solution to this problem involves constructing the display in a series of fixed vertical or horizontal straps, as disclosed in U.S. Pat. No. 5,900,850, with spaces between the display straps such that an appearance of transparency can be created by controlling the illumination levels of objects behind the display. When the objects behind are illuminated, they are visible through the gaps between the straps. When they are dark, they can not be seen. This method has the disadvantage that the display actually has a fixed transparency that can not be altered and that relies instead upon the human eye interpreting brightness levels as transparency. A further disadvantage of the system is that for the display to appear solid, the area behind has to be dark, thus making it difficult to for stage hands and performers to work behind the system or set up new scenery because they are never truly hidden from view. Further, these systems are large and suffer the same problems with respect to ease of installation and removal as described with respect to the solid units discussed above.

Attempts have been made to address these deficiencies by providing curtains or drapes that can be lowered or drawn behind the display strips to provide a completely opaque unit. This has the disadvantage that the curtain or drape is obvious to the audience as it is inserted or removed and further that it takes time to traverse the complete display, thus providing a "wipe" where the scene behind is revealed progressively from the display side rather then achieving an overall dissolve in transparency as is most desirable. In a further attempt to address some of these issues, displays have been created wherein the light emitting elements have been incorporated into a fabric curtain, as disclosed in U.S. Pat. No. 6,362,801 and U.S. Pat. No. 6,677,918, so as to provide a structure that is more easily constructed and removed. These displays are typically of low resolution and although they are easier to install and remove, they do not solve the controlled transparency issues. In addition, these displays have difficulty providing stable imagery due to the stretching and movement of cloth backing as described above. Thus, the systems are not suitable for permanent installations or as part of an architectural design or for advertising purposes.

SUMMARY OF INVENTION

In accordance with embodiments of the invention, a display system comprises a plurality of display units, wherein each of the plurality of display units is movable between at least a first position and a second position, and wherein each display unit comprises at least a first light emitting element. In some embodiments, each display unit is rotatable about an axis thereof, such that the first position is defined as a first angular position of rotation about the axis, and the second position is defined as a second angular position of rotation about the axis.

In accordance with embodiments of the invention, a method is described of operating a display system having a plurality of display units, wherein each of the plurality of display units is movable between at least a first position and a second position, and wherein each display unit comprises at least a first light emitting element. The method comprises: moving the display units from the first position to the second position, thereby exposing a first display surface; controlling emission of light from the first light emitting element of each of the display units; and returning the display units to the first position. In some embodiments, moving the display units from the first position to the second position comprises rotation of each of the display units about an axis thereof.

In accordance with embodiments of the invention, a method of installing a display system, comprises: securing a display panel to a support, the display panel comprising a plurality of display units initially in a storage position; extending the plurality of display units into an operation position; and operating light emitting elements disposed on the display panels. In some embodiments, the method further comprises rotating the display units from a first position to a second position while in the operation position.

DETAILED DESCRIPTION

Various embodiments of the invention will now be described with reference to the accompanying figures. Like elements in the various figures will be referred to by like numerals for consistency.

Figure 1:
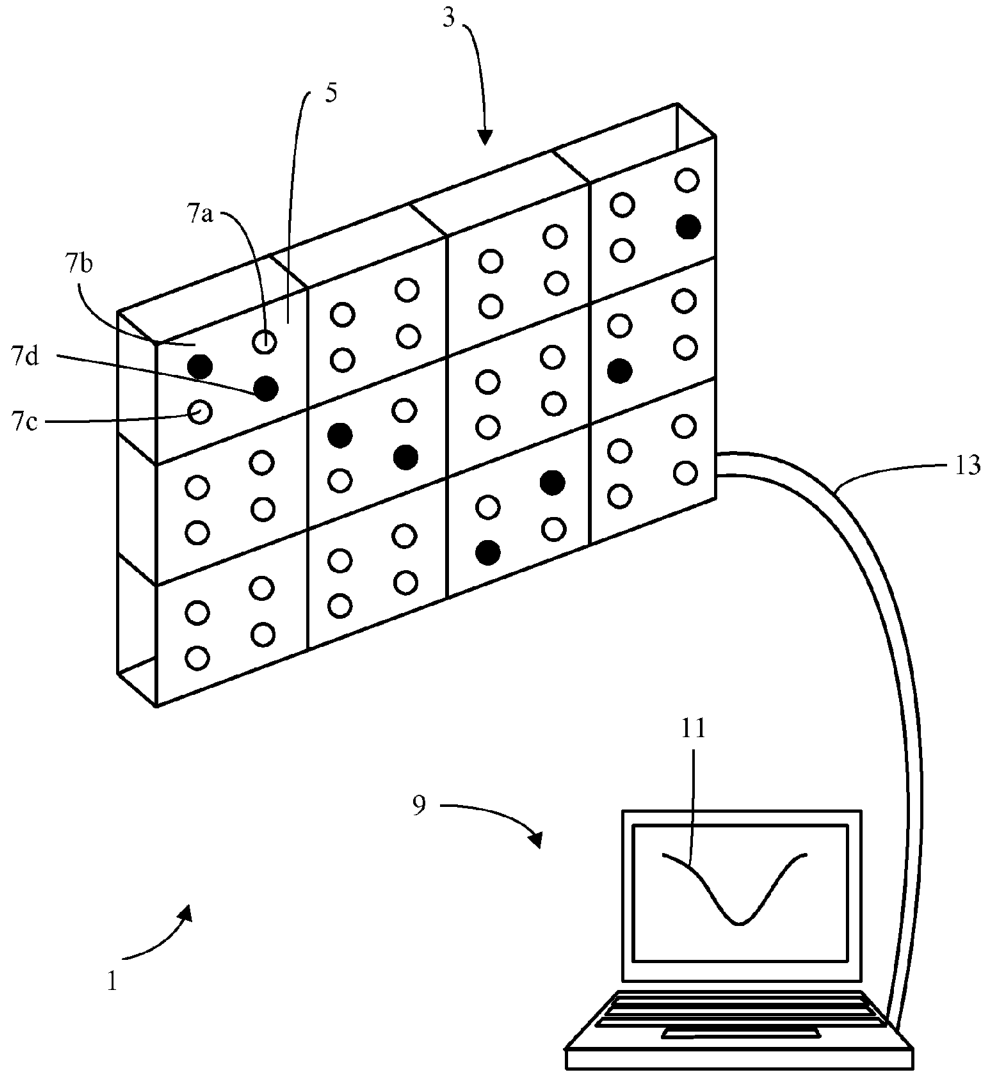
Fig. 1 (Prior Art)
FIG. 1 shows an exemplary prior art display system.

FIG. 1 shows a typical prior art display system. The display system 1 is made up of an array 3 of tiles 5, each having a plurality of four light emitting elements 7*a*-7*d*. The array 3 is controlled by a control device 9 such as a computer or other lighting display control device known in the art. An image 11 that is desired to be displayed is generated by the control device 9 and transmitted to the array 3 via a cable 13 or other conventional means. This causes the illumination of the respective light emitting elements in the array 3 to cause display of the desired image. The displayed image may be static, sequential frames, or video according to the given application.

Figure 2:
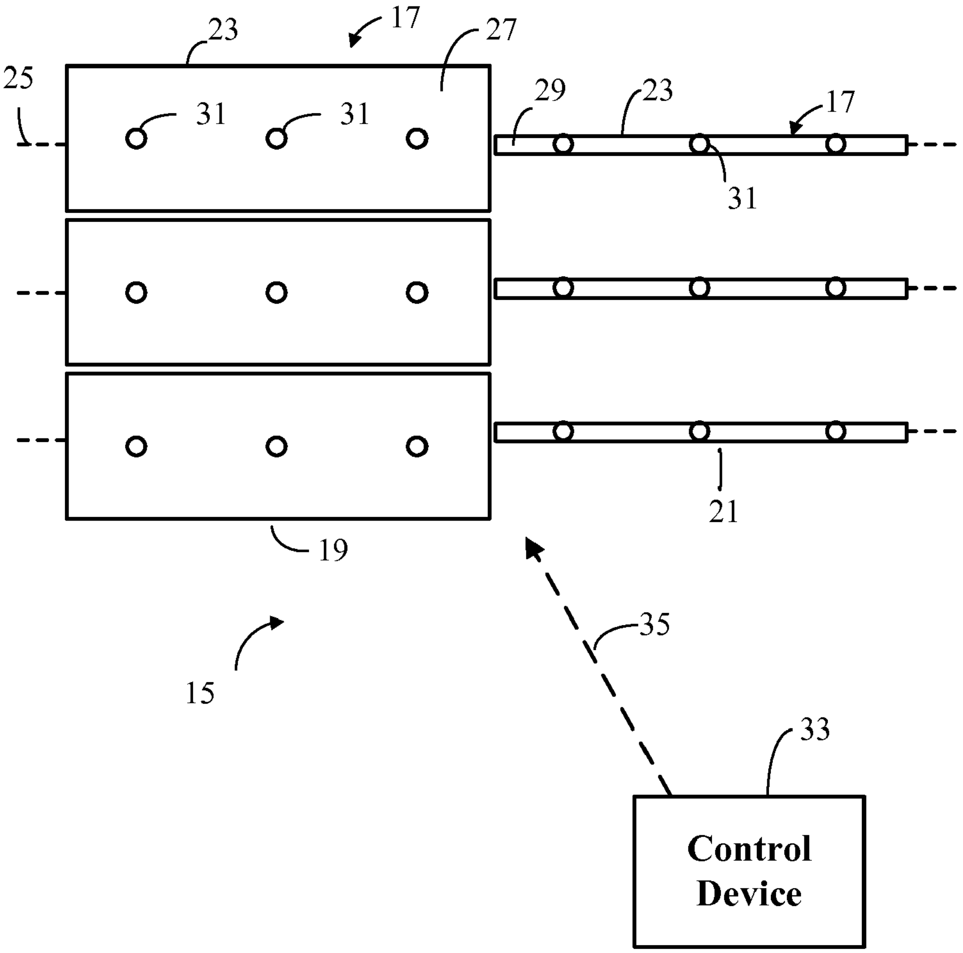
FIG. 2 shows a display system in accordance with one embodiment of the invention.

FIG. 2 shows a schematic diagram of a display system in accordance with one embodiment of the invention. As shown in this embodiment, a display system 15 comprises a plurality of display units 17 arranged in one or more panels. In the embodiment shown, a first panel 19 and a second panel 21 are employed each of which has a plurality of display units 17 arranged in vertically spaced fashion. Each display unit 17 is made up of an elongated member 23 that is rotatable about an axis of rotation 25. Each display unit 17 defines at least a first display surface 27 and a second display surface 29. As shown in FIG. 2, in panel 19 the display units 17 are arranged such that the first display surfaces 27 thereof are substantially coplanar and face outward toward an intended audience. In panel 21, the display units 17 have been rotated 90° so that the second display surfaces 29 are substantially coplanar and face outward toward the intended audience. Although in this example first and second display surfaces are disclosed, additional display surfaces may be employed as described below. In addition, although in this embodiment the display units are shown as elongated rectangular members, any type of members arranged to be rotatable about an axis may be used, as in various alternative embodiments described below.

Each of the first display surface 27 and the second display surface 29 is provided with a plurality of light emitting elements 31, which may be light emitting diodes (LEDs), incandescent lights, or any other known type of light source. As used herein, the term "light emitting element" will be used generically to encompass any type of light emitting element. Further, in the embodiment shown in FIG. 2, three light emitting elements are shown on each display surface arranged in a linear fashion. However, any number of light emitting elements may be used, and they may be disposed in any desired orientation or pattern. Further, although the light emitting elements will be described herein as being disposed "on" a display surface, it will be understood by one skilled in the art that the light emitting elements may be actually be disposed within the display units 17, either within a recess therein or formed within the member itself, provided that light may be emitted therefrom through the display surface. Furthermore, in some embodiments, a light emitting element may be disposed within a display unit such that light emitted therefrom may pass through more than one display surface of the display unit.

A control device 33 is provided to control the display system 15. Instructions from the control device 33 are transmitted to the display system 15 via a cable 35 or any other known means of information transmission. The control device 33, in addition to controlling illumination of the light emitting elements in the manner described above with reference to prior art FIG. 1, also preferably controls the orientation of the display units 17 as described in more detail below.

Figure 3A:
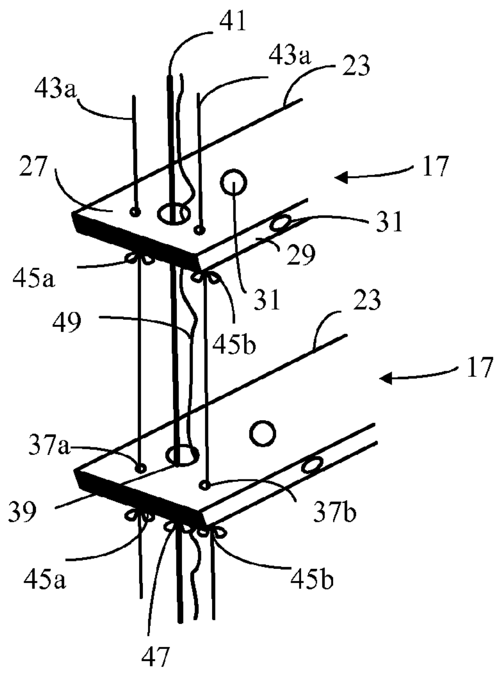
FIG. 3A shows a detailed view of a portion of a display system in accordance with one embodiment of the invention.

FIG. 3A show an enlarged, partial perspective view of one embodiment in accordance with the schematic representation of FIG. 2. In this view, two display units 17 are shown, although in actuality a greater number of display units would typically be employed. Each display unit 17, as before, is made up of an elongated member 23 defining at least a first display surface 27 and a second display surface 29. Light emitting elements 31 are placed at desired locations on one or more of these surfaces. As previously mentioned, the display unit 17 may define more than two display surfaces, or only a single display surface. In addition, the number and placement of light emitting elements shown is for illustration purposes only, and can be varied according to the desired application.

FIG. 3A shows one embodiment of a mechanism for controlling position and orientation of display unit 17. In this embodiment, each display unit 17 has formed therein, on each end thereof (only one end is shown) three apertures denoted as 37*a*, 37*b*, and 39. Aperture 39 is preferably disposed centrally within each end of the first display surface of the elongated member 23. A retraction mechanism for controlling the positions of the display units 17 includes a cable 41 that passes through the aperture 39 of the display units 17. In addition, control cords 43*a*, 43*b* pass through the apertures 37*a*, 37*b* respectively. At the underside of each display unit 17, a clamp, knot, or other means 45*a*, 45*b* is provided to prevent movement of the cords 43*a*, 43*b* relative to the respective aperture 37*a*, 37*b*. In addition, at the bottom of the lowermost display unit 17, a clamp, knot, or other means 47 is provided on the cable 41 to prevent movement thereof through the aperture 39. In a manner described in more details below, cable 41 and cords 43*a*, 43*b* can be actuated so as to control positions and relative orientations of the display units 17 within a panel. An electrical cord 49 may also be passed through the aperture 39 alongside the cable 41 to provide electrical connection to the display units 17.

Figure 3B:
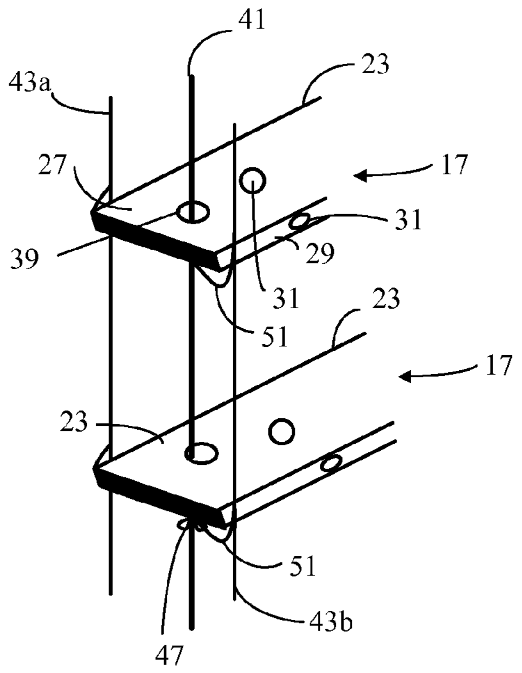
FIG. 3B shows a detailed view of a portion of a display system in accordance with another embodiment of the invention.

In an alternative embodiment shown in FIG. 3B, a web member 51 is provided connecting the cords 43*a*, 43*b* on the underside of each display unit 17. In accordance with this embodiment, the cords 43*a*, 43*b* pass along the outer surfaces of the display unit 17, rather than passing through apertures therein. The cord 41 passes through central apertures 39 in the display units 17 as in the prior embodiment.

Although two distinct embodiments have been described above for retraction mechanisms to control the position and relative orientation of the display units 17, any variant thereof, as would be understood by one skilled in the art, would be acceptable to achieve the desired control of the display units 17 within a panel.

Figure 4A:
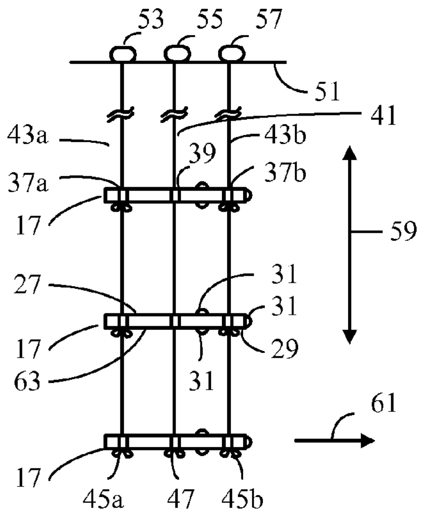
FIG. 4A shows a side view of a display system in accordance with one embodiment of the invention in one position.

FIGS. 4A-4D show side views of the embodiment of FIG. 3A, with the display units 17 in various orientations. Although for the purposes of illustration the embodiment of the retraction mechanism of FIG. 3*a* is used, the embodiment of FIG. 3B would be equally applicable, as would any other suitable mechanisms. Turning specifically to FIG. 4A, it can be seen that three display units 17 are disposed in vertically spaced relation within a display panel. Although three display units are shown for illustration purposes, any desired number of display units could be used for a specific application. The retraction mechanism is attached to a support 51, such as a beam, a pre-fabricated support, an architectural member, or any other member or device suitable for supporting the display system. Each of the cable 41 and the cords 43*a*, 43*b* has a respective actuator 53, 55, 57 that causes the cable or cord to be let out or taken in to cause movement thereof in the direction of arrow 59. Although the actuators 53, 55, 57 are not shown in detail, they may be any type of conventional mechanism including without limitation electrically actuated spools operable under control of the control device 33, or manually actuated devices.

In the position shown in FIG. 4A, the cords 43*a*, 43*b* and the cable 41 are all extended at equal length to cause the display units 17 to rest in a flat, horizontal position such that the second display surfaces are substantially coplanar and the first display surfaces 27 are substantially perpendicular to the coplanar position. In this configuration, light emitting elements 31 disposed on the second display surfaces of the display units 17 are visible to an audience and project light generally in the direction shown by an arrow 61. Light emitting elements 31 disposed on the first display surface would not be directly visible in the direction of an arrow 61, but nonetheless may be illuminated to produce a desired effect. In addition, the display units 17 may define a third display surface 63 having one or more light emitting elements 31 disposed thereon. In this configuration, a desired lighting effect can be produced by controlling illumination of the light emitting elements 31 on the second display surface 29, while maintaining a significant transparency in the display system by allowing a viewer to see through the spaces between adjacent display units 17.

Figure 4B:
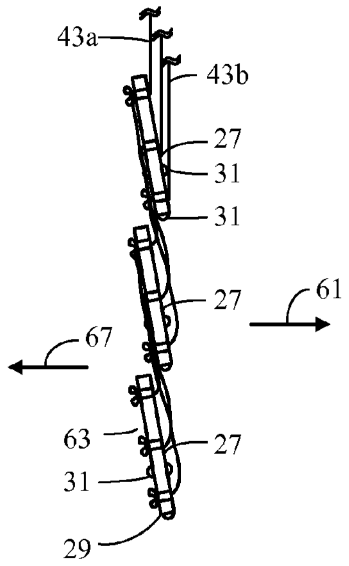
FIG. 4B shows a side view of the embodiment of FIG. 4A in another position.

Turning to FIG. 4B, in this example cord 43*a* has been tightened so as to move the display units 17 into a substantially vertical position, such that the first display surfaces are substantially coplanar and the second display surfaces are substantially perpendicular to the coplanar position. Depending upon the exact nature of the chosen retraction mechanism, the degree to which the first display surfaces are actually "coplanar" may vary from an actual or perfect coplanar position to a substantially coplanar position wherein the display units 17 remain at a slight angle to the absolute vertical as shown in FIG. 4B. As used herein, the term "substantially coplanar" shall be construed broadly to include an arrangement such as that shown in FIG. 4B. In this arrangement, the light emitting elements 31 on the front display surfaces 27 are visible on one side of the display system (in the direction of arrow 61), and, if provided, the light emitting elements 31 on the third display surfaces 63 are visible on the other side of the display system (in the direction of arrow 67). Either or both sides of the display system can be actuated in this configuration according to a desired implementation.

Figure 4C:
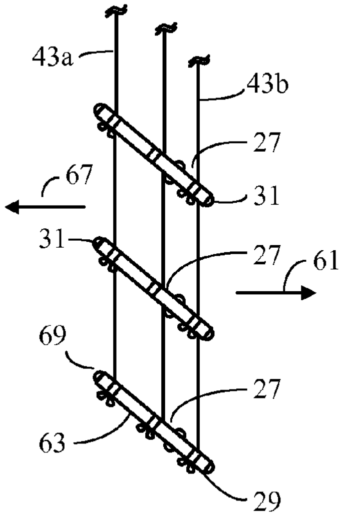
FIG. 4C shows a side view of the embodiment of FIG. 4A in yet another position.

Turning now to FIG. 4C, the display units 17 are shown at a position representing an intermediate state of rotation between the position shown in FIG. 4A and the position shown in FIG. 4B. Clearly, in this configuration, light emitted by light emitting elements 31 on the second display surfaces 29 and light emitted from the light emitting elements 31 on the first display surfaces 27 can be seen in the direction denoted by arrow 61. Similarly, light emitted by the light emitting elements 31 on the third display surface 63 can be seen in the direction denoted by the arrow 67. Furthermore, if desired, the display units 17 may define a fourth display surface 69 having one or more additional light emitting elements 31. In this case, light emitted by these light emitting elements would also be visible in the direction denoted by arrow 67. The positions shown in FIGS. 4A-4C shall be referred collectively herein as "operation positions".

Figure 4D:
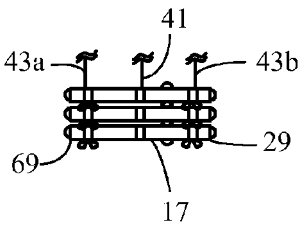
FIG. 4D shows a side view of the embodiment of FIG. 4A in yet another position.

FIG. 4D shows a side view of a display system in accordance with one embodiment of the invention in a storage position. In this position, the display units 17 have been moved into the position shown in FIG. 4A, and then the cord 41 has been retracted to pull all of the display units 17 into close relation. In this way the display system of the invention can be easily retracted for storage when not in use, between acts in a theatrical production, or at any other time when use of the display system is not desired. It is noted that, even in this storage configuration, the light emitting elements disposed on the second display surfaces 29 and/or the fourth display surfaces 69 may still be illuminated for a desired effect.

Figure 5:
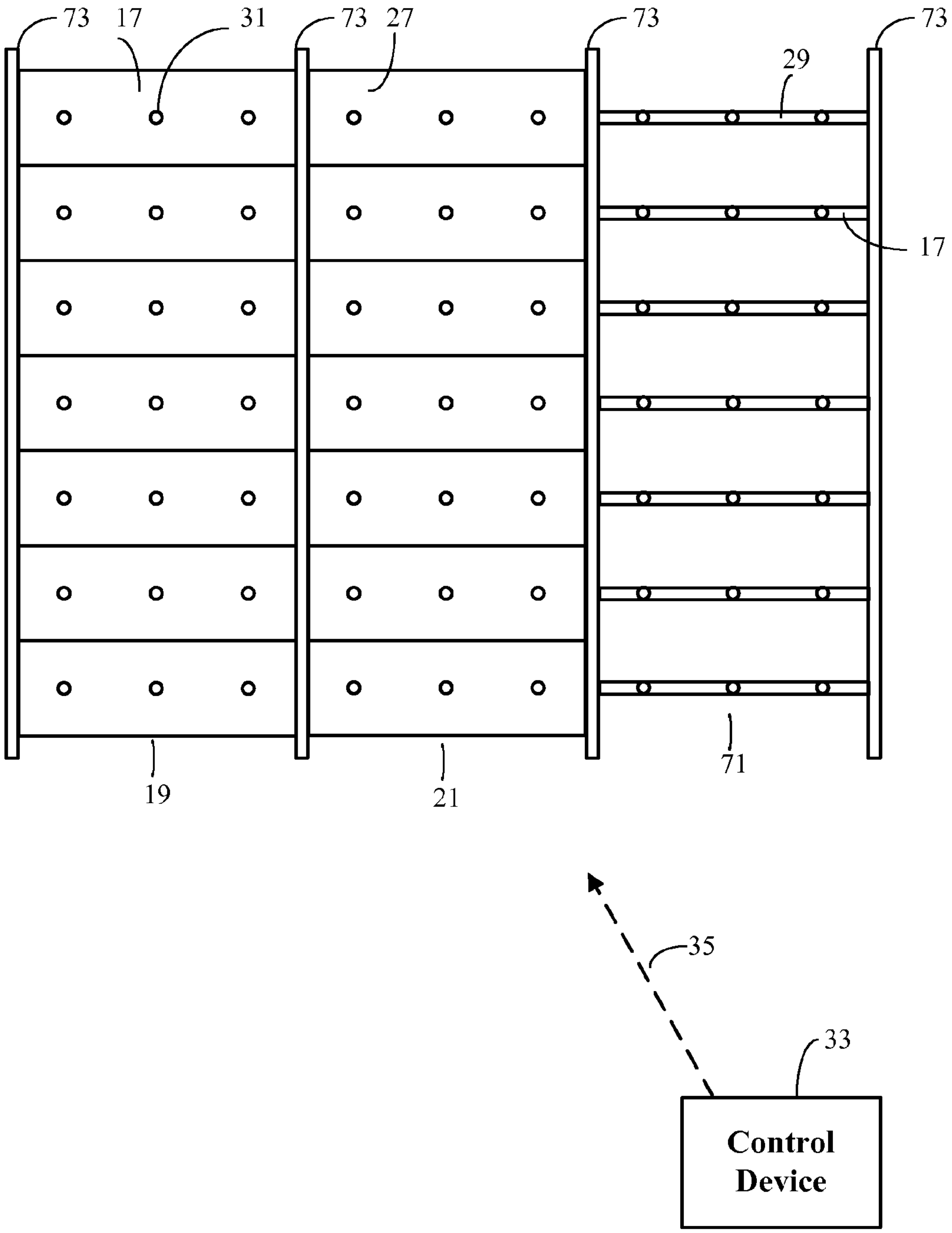
FIG. 5 shows a display system in accordance with another embodiment of the invention.

FIG. 5 shows a schematic view of a display system in accordance with another embodiment of the invention. As in the embodiment shown in FIG. 2, a plurality of display units 17 are employed and disposed in panels. In this embodiment, for purposes of illustration, three panels are shown, i.e., panel 19, panel 21 and panel 71. In panels 19 and 21, the display units 17 are shown in a position like that of FIG. 4B, wherein the first display surfaces are substantially coplanar. In panel 71, the display units 17 are shown in a position like that of FIG. 4A, wherein the second display surfaces 29 are substantially coplanar. Of course, each panel can be controlled individually, and any desired orientation of the display units 17 within a panel can be achieved.

Figure 6:
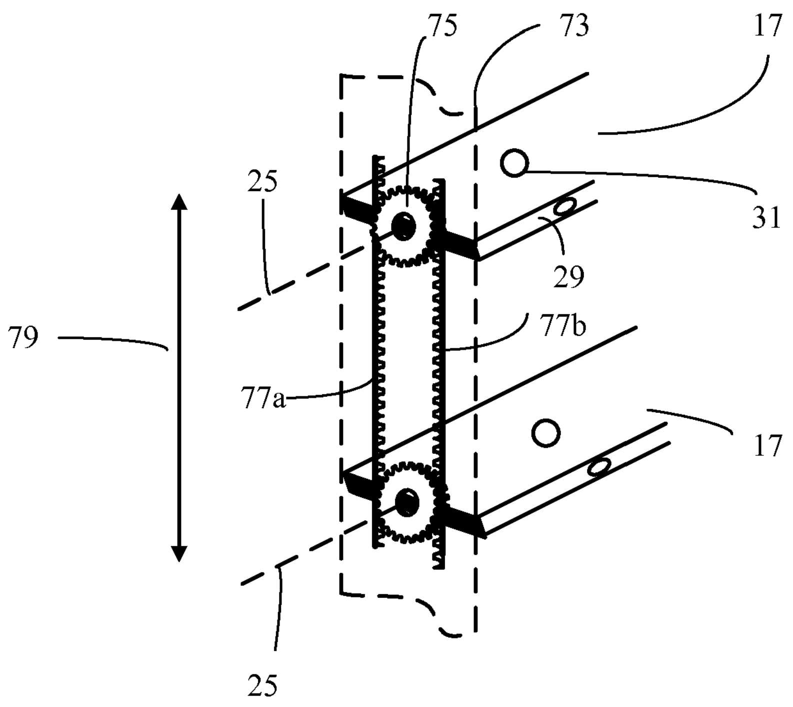
FIG. 6 shows a perspective detailed view in accordance with one embodiment of the invention.
Figure 7:
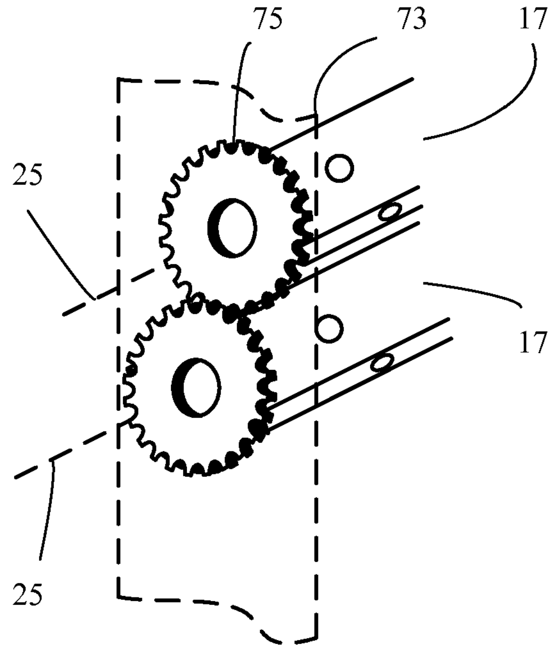
FIG. 7 shows a perspective detailed view in accordance with another embodiment of the invention.

In the embodiment of FIG. 5, the display units 17 are supported by rails 73 that provide both support and rotational control to the display units 17. The manner in which the support and rotational motion is imparted to the display units 17 may be achieved by any conventional means. In one embodiment, as shown in FIG. 6, each display unit 17 is provided with a gear 75 that cooperates with linear actuating members 77*a*, 77*b* disposed within each rail 73. By manipulating the relative motion of linear actuating members 77*a*, 77*b* in the direction denoted by arrow 79, relative rotation of the display units 17 may be achieved. In an alternative arrangement, as shown in FIG. 7, the gears 75 may be sized so as to intermesh directly, such that rotation of the first one of the display units 17 causes an equal and opposite amount of rotation in each successive display unit 17 along the rail 73. FIGS. 6 and 7 show but two mechanical arrangements for achieving the required support and relative rotation for the display units 17. Any mechanism, including electric motors, cables, pulleys, pneumatic devices, etc., would be acceptable provided that the display units 17 may be controllably rotated along the respective axes 25 thereof.

Figure 8A:
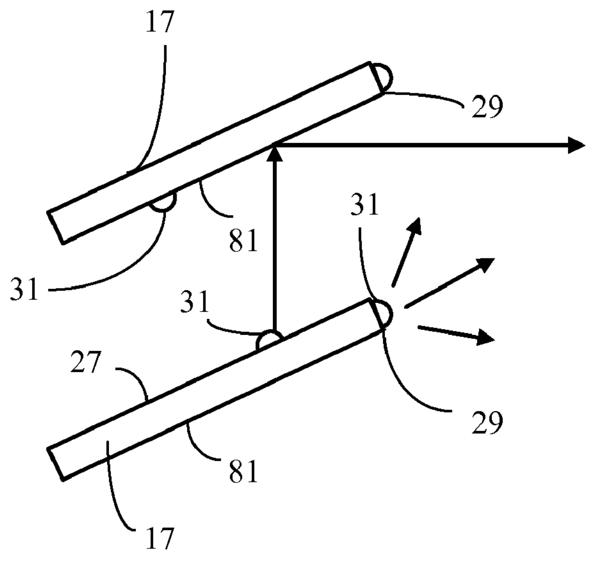
FIG. 8A shows a schematic diagram illustrating reflection of light in accordance with one embodiment of the invention.

FIG. 8A shows a side view of two display units 17 in accordance with one embodiment of the invention. The manner of achieving and controlling relative rotation of the display units 17 is not shown in this figure or in FIG. 8B discussed below for purposes of clarity. However, it will be understood that any of the above-described means, as well as any other suitable means, would be acceptable. In this embodiment, the display units 17 are disposed in a position intermediate between the positions shown in FIGS. 4A and 4B above. In this embodiment the surface opposite first display surface 27, denoted here as surface 81, has been formed as a reflective surface. This surface could also simultaneously be a display surface. In this configuration, light emitted by light emitting element 31 on the second display surface 29 can be seen by the viewer. In addition, light emitted by light emitting element 31 on the first display surface 27 is projected upwards and reflected by reflective surface 81 toward the viewer. Thus, by altering the relative angles between adjacent display units 17, a desired lighting effect can be obtained. Of course a similar effect could be obtained in the opposite direction by causing light emitted by a light emitting element 31 on surface 81 to be reflected from first display surface 27 of the adjacent display unit 17.

Figure 8B:
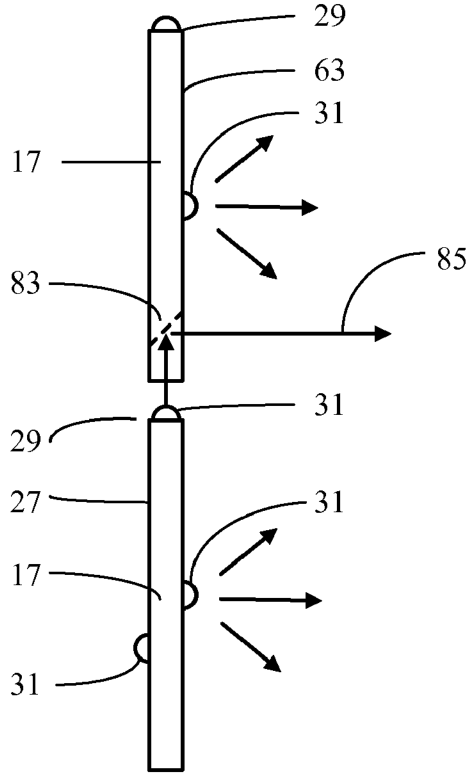
FIG. 8B shows a schematic diagram illustrating reflection of light in accordance with another embodiment of the invention.

FIG. 8B shows another embodiment of the invention wherein the display units 17 are in a position such that the first display surfaces 27 are substantially coplanar. In this embodiment, a lower portion of at least one of the display units 17 is provided with an internal reflection device 83. As a result of this structure, light emitted by light emitting element 31 on the second display surface 29 of one display unit 17 is projected upwardly and into the adjacent display unit 17, and then reflected by internal reflection device 83 in the direction shown by arrow 85. Thus, a combined lighting effect can be created by using light emitted by the light emitting element 31 on the second display surface 29 as well as the light emitting elements disposed on the third display surface 63. A similar effect on the opposite side of the display system can be achieved by reversing the orientation of the internal reflecting device 83 toward the side of the first display surfaces 27. Also, an additional internal reflecting device could be employed at a top portion of the display unit 17.

Figure 9A:
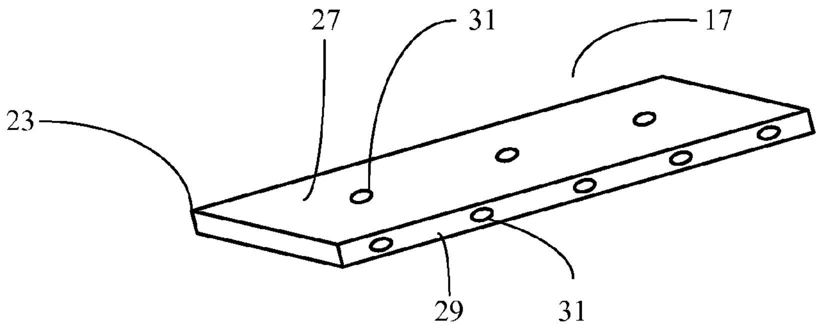
FIG. 9A shows a perspective view of an elongated member in accordance with one embodiment of the invention.
Figure 9B:
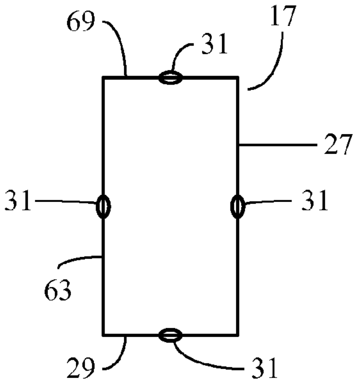
FIGS. 9B-9I show end views of elongated members having various cross sections in accordance with various embodiments of the invention.
Figure 9C:
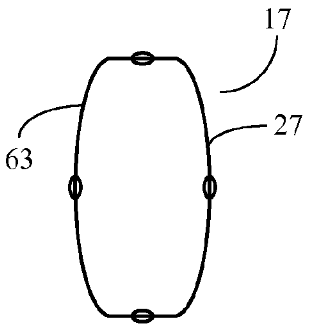
Figure 9D:
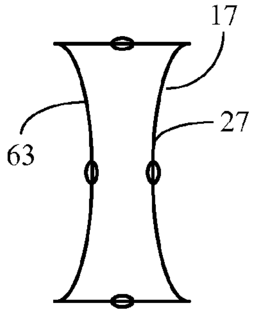
Figure 9E:
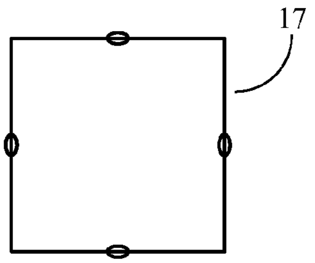
Figure 9F:
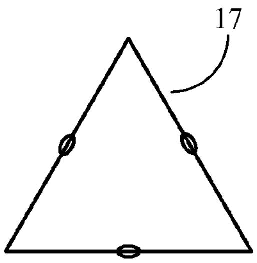
Figure 9G:
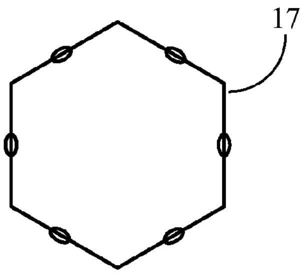
Figure 9H:
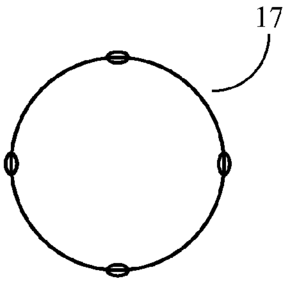
Figure 9I:
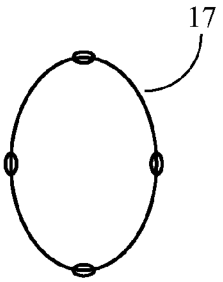

FIG. 9A shows a perspective view of one embodiment of a display unit 17 of the invention. In this embodiment, as described previously, the display unit 17 takes the form of an elongated member 23 having a rectangular cross section and defining at least one display surface having at least one light emitting element disposed thereon. As shown in cross section FIG. 9B, the elongated member 23 may define up to four display surfaces each having one or more light emitting elements disposed thereon. Furthermore, as shown in FIG. 9C, the first display surface 27 and the third display surface 63 may be convex. As shown in FIG. 9D, the first display surface 27 and the third display surface 63 may be concave. Furthermore, the cross section of elongated member 23 may be square as shown in FIG. 9E, triangular as shown in FIG. 9F, hexagonal as shown in FIG. 9G, circular as shown in FIG. 9H, oval as shown in FIG. 91, or any other shape. In each of these cross sectional configurations, the elongated member 23 may define one or many display surfaces having one or more light emitting elements disposed thereon.

In operation, a display system in accordance with one embodiment of the invention is mounted to an architectural structure, beam, or other mounting device via a retraction mechanism such as that described in the exemplary embodiment of FIGS. 4A-4D. By controlling the actuator 55 of the cord 41, the display units 17 are then extended or retracted as desired for a given application. Actuators 53 and 57 are then employed to adjust cords 43*a*, 43*b* to place the display unit 17 in a desired angular position. Illumination of the light emitting element 31 on one or more display surfaces of one or more of the display units 17 is then achieved under control of the control device 33. Alternatively, in accordance with the embodiment described above with reference to FIGS. 5-7, in operation a display system in accordance with one embodiment of the invention may be installed using a system of rails 73, whereupon a desired angular position of rotation of each of the display units 17 within one or more panels may be achieved as described above. Illumination of one or more light emitting element on one or more display surface of one or more of the display units 17 may then be achieved under control of the control device 33.

Although various detailed and exemplary embodiments of the invention have been described above for purposes of illustration, the invention is not so limited. Other shapes, sizes and configurations of the light emitting elements 17 would be understood by one skilled in the art and are within the scope of the invention. Furthermore, although various embodiments of a retraction mechanism have been described for purposes of illustration, other configurations and mechanisms may be employed as would be understood by one skilled in the art without departing from the scope of the invention. Moreover, although a rail-mounted configuration has been described in accordance with one embodiment of the invention, other means for support, and other means for achieving the desired angular position of the display units 17, may be employed without departing from the scope of the invention. Furthermore, although the various embodiments described herein for purposes of illustration depict the display units 17 forming flat surfaces, it is clear that other configurations may be employed to produce curved or shaped surfaces as would be apparent to someone skilled in the art. Accordingly, the scope of the invention shall be limited only by the scope of the claims that follow.

What is claimed is:

1. A display system comprising:

a plurality of display unit slats, wherein each display unit slat comprises:

a first pair of noncontacting sides, a second pair of noncontacting sides, and a third pair of noncontacting sides, each of the first, second, and third pair of noncontacting sides having a surface area different from other pairs, wherein the first pair of noncontacting sides comprises top and bottom surfaces and a first surface area, the second pair of noncontacting sides comprises front and back surfaces and a second surface area, the third pair of noncontacting sides comprises left and right surfaces and a third surface area, the first surface area is greater than the second surface area, and the second surface area is greater than the third surface area, wherein each display unit slat is movable between at least a first position and a second position, which alters a distance between a front surface of a display unit slat and a back surface of an adjacent display unit slat, and wherein at least one lighting element is viewable on the top surface.

2. The display system of claim 1 further comprising a rotation mechanism to move at least two display unit slats together from the first position to the second position, wherein the rotation mechanism comprises at least one of a cord or a gear.

3. The display system of claim 1 further comprising a retraction mechanism to retract the display units to a storage position, wherein in the storage position, the plurality of display units form a stack of display units, the stack having about a footprint of a single display unit and a height compressed relative to the display unit slats not in the storage position.

4. The display system of claim 1 wherein one display unit comprises at least partial translucence.

5. The display system of claim 1 wherein at least one lighting element is viewable on the front surface.

6. The display system of claim 1 wherein at least one lighting element is viewable on the bottom surface.

7. The display system of claim 1 comprising a display unit slat of the plurality having at least one surface that is curved.

8. The display system of claim 1 comprising a cord passing through openings in at least two adjacent slats.

9. The display system of claim 1 comprising:

an electronic device, coupled to the display unit slats, wherein the electronic device transmits video information to the display unit slats to display video via the at least one lighting element.

10. The display system of claim 1 wherein the at least one lighting element comprises a light emitting diode.

11. A display system comprising:

a plurality of display unit slats, wherein each display unit slat comprises:

a first pair of noncontacting sides, a second pair of noncontacting sides, and a third pair of noncontacting sides, each of the first, second, and third pair of noncontacting sides having a surface area different from other pairs, wherein the first pair of noncontacting sides comprises top and bottom surfaces and a first surface area, the second pair of noncontacting sides comprises front and back surfaces and a second surface area, the third pair of noncontacting sides comprises left and right surfaces and a third surface area, the first surface area is greater than the second surface area, and the second surface area is greater than the third surface area, wherein each display unit slat is movable between at least a first position and a second position, which alters a distance between a front surface of a display unit slat and a back surface of an adjacent display unit slat, and wherein at least one lighting element is viewable on the front surface.

12. The display system of claim 11 wherein at least one lighting element is viewable on the bottom surface.

13. The display system of claim 11 comprising first and second railings extending in a transverse direction, wherein the display unit slats are coupled between the first and second railings.

14. The display system of claim 11 comprising:

an electronic device, coupled to the display unit slats, wherein the electronic device transmits video information to the display unit slats to display video via the at least one lighting element.

15. The display system of claim 11 wherein the at least one lighting element comprises a light emitting diode.

16. The display system of claim 11 comprising a cord passing through openings in at least two adjacent slats.

17. A display system comprising:

a plurality of display unit slats, wherein each display unit slat comprises:

a first pair of opposing sides, a second pair of opposing sides, and a third pair of opposing sides, each of the first, second, and third pair of opposing sides having a surface area different from other pairs, wherein the first pair of opposing sides comprises top and bottom surfaces and a first surface area, the second pair of opposing sides comprises front and back surfaces and a second surface area, the third pair of opposing sides comprises left and right surfaces and a third surface area, the first surface area is greater than the second surface area, and the second surface area is greater than the third surface area, wherein each display unit slat is movable between at least a first position and a second position, which alters a distance between a front surface of a display unit slat and a back surface of an adjacent display unit slat, and wherein at least one lighting element is viewable on the top surface.

18. The display system of claim 17 wherein at least one lighting element is viewable on the front surface.

19. The display system of claim 17 wherein at least one lighting element is viewable on the bottom surface.

20. The display system of claim 17 comprising first and second rails extending transverse to a display unit slat, wherein display unit slats are coupled between the first and second rails.

21. The display system of claim 17 wherein the plurality of display unit slats is a plurality of first display unit slats, and the display system comprises:

a first rail, second rail, and third rail extending transverse to the first display unit slats, wherein the first display unit slats are coupled between the first and second rails; and a plurality of second display slats, coupled between the second and third rails.

22. The display system of claim 21 wherein the second display slats are movable to positions different from positions of the first display slats.

23. The display system of claim 17 wherein a display unit slat of the plurality comprises a curved top, a curved bottom, or a curved top and a curved bottom.

24. The display system of claim 17 wherein at least a portion of a display unit slat is transparent.

25. The display system of claim 17 wherein the at least one lighting element comprises a light emitting diode.

26. The display system of claim 17 wherein at least one lighting element is within the display unit slat.

27. The display system of claim 17 comprising a cord passing through openings in at least two adjacent slats.

28. The display system of claim 17 comprising:

an electronic control device, coupled to the display unit slats, wherein the electronic control device transmits video information to the display unit slats to display video by way of the at least one lighting element.

29. The display system of claim 17 comprising a retracting mechanism to retract the display unit slats to a compressed position, wherein in the compressed position, the plurality of display unit slats form a stack having a compressed height relative to display unit slats not in the compressed position.

30. The display system of claim 17 further comprising a rotation mechanism to move at least two display unit slats together from the first position to the second position, wherein the rotation mechanism comprises at least one of a cord or a gear.

31. A display system comprising:

a plurality of display unit slats, wherein each display unit slat comprises:

a first pair of opposing sides, a second pair of opposing sides, and a third pair of opposing sides, each of the first, second, and third pair of opposing sides having a surface area different from other pairs, wherein the first pair of opposing sides comprises top and bottom surfaces and a first surface area, the second pair of opposing sides comprises front and back surfaces and a second surface area, the third pair of opposing sides comprises left and right surfaces and a third surface area, the first surface area is greater than the second surface area, and the second surface area is greater than the third surface area, wherein each display unit slat is movable between at least a first position and a second position, which alters a distance between a front surface of a display unit slat and a back surface of an adjacent display unit slat, and wherein at least one lighting element is viewable on the front surface.

32. The display system of claim 31 wherein at least one lighting element is viewable on the bottom surface.

33. The display system of claim 31 wherein the at least one lighting element is a light emitting diode.

34. The display system of claim 31 comprising first and second rails extending transverse to the display unit slats, wherein the display unit slats are coupled between the first and second rails.

35. The display system of claim 31 wherein the plurality of display unit slats is a plurality of first display unit slats, and the display system comprises:

first, second, and third railings extending transverse to the first display unit slats, wherein the display unit slats are coupled between the first and second railings; and a plurality of second display slats, coupled between the second and third railings.

36. The display system of claim 35 wherein the second display slats between the second and third railings are movable to positions not dependent on positions of the first display slats between the first and second railings.

37. The display system of claim 31 wherein at least a portion of a display unit slat of the plurality comprises at least one of a curved top or curved bottom surface.

38. The display system of claim 31 wherein at least a portion of a display unit slat of the plurality is translucent.

39. The display system of claim 31 wherein the back surface is sloped.

40. The display system of claim 31 wherein at least one lighting element is within a display unit slat.

41. The display system of claim 31 comprising a cord passing through openings formed in at least two adjacent slats.

42. The display system of claim 31 comprising a rotation mechanism to move at least two display unit slats together from the first position to the second position, wherein the rotation mechanism comprises at least one of a control cord or a gear assembly.

43. The display system of claim 31 comprising a retraction mechanism to retract the display unit slats to a storage position, wherein in the storage position, the display unit slats form a stack having approximately a footprint of a single display unit slat and a compressed height.

44. The display system of claim 31 comprising:

an electronic device, coupled to the display unit slats, wherein the electronic device transmits video information to the display unit slats to display video via the at least one lighting element.

* * * * *